(12) United States Patent
Johnston

(10) Patent No.: US 6,623,028 B1
(45) Date of Patent: Sep. 23, 2003

(54) STOWABLE TRAILER/DOLLY SYSTEM

(76) Inventor: Geoffrey Hugh Johnston, 247 Lesmurdie Road, Lesmurdie WA 6076 (AU)

( * ) Notice: Subject to any disclaimer, the term of this patent is extended or adjusted under 35 U.S.C. 154(b) by 0 days.

(21) Appl. No.: 09/786,952

(22) PCT Filed: Sep. 11, 1998

(86) PCT No.: PCT/AU98/00750
§ 371 (c)(1),
(2), (4) Date: Jun. 13, 2001

(87) PCT Pub. No.: WO99/12800
PCT Pub. Date: Mar. 18, 1999

(30) Foreign Application Priority Data

Sep. 11, 1997 (AU) .............................. PO9121

(51) Int. Cl.[7] ............................................. B62B 1/00
(52) U.S. Cl. ................................................ 280/656
(58) Field of Search .......................... 280/656, 638, 280/415.1, 43; D12/101, 106; 414/538, 559, 539, 482, 494, 500; 296/181, 182, 26.01, 26.03

(56) References Cited

U.S. PATENT DOCUMENTS

| | | | |
|---|---|---|---|
| 2,254,437 A | | 9/1941 | Marney |
| 3,154,164 A | * | 10/1964 | Shaw et al. ............... 180/44 |
| 3,210,784 A | * | 10/1965 | Krance .................... 114/314 |
| 3,697,098 A | * | 10/1972 | Fisher .................... 280/415 |
| 3,838,885 A | | 10/1974 | Brennan et al. |
| 3,843,002 A | * | 10/1974 | Pilgren ................... 214/450 |
| 3,877,714 A | | 4/1975 | Black |
| 3,895,818 A | | 7/1975 | Fearon |
| 4,006,913 A | | 2/1977 | Rimhagen |
| 4,593,840 A | * | 6/1986 | Chown .................... 224/520 |
| 4,671,530 A | * | 6/1987 | Van Der Wouden ........ 280/656 |
| 4,744,590 A | * | 5/1988 | Chesney .................. 280/769 |
| 4,746,142 A | * | 5/1988 | Davis ..................... 280/656 |
| 5,013,058 A | | 5/1991 | Kruger |
| 5,234,307 A | * | 8/1993 | Scott ..................... 414/467 |
| 5,249,823 A | * | 10/1993 | McCoy et al. ............ 280/656 |
| 5,259,720 A | * | 11/1993 | Lobner ................... 414/483 |
| 5,326,128 A | * | 7/1994 | Cromley, Jr. ............ 280/656 |
| 5,354,090 A | * | 10/1994 | Grovom ................... 280/656 |
| 5,556,249 A | * | 9/1996 | Heine .................... 414/500 |
| 6,149,372 A | * | 11/2000 | Lee et al. ............... 414/538 |
| 6,254,117 B1 | * | 7/2001 | Cross .................... 280/401 |

FOREIGN PATENT DOCUMENTS

WO    9413509    6/1994    ............ B60P/3/12

* cited by examiner

*Primary Examiner*—Brian L. Johnson
*Assistant Examiner*—G B Klebe
(74) *Attorney, Agent, or Firm*—Burr & Brown

(57) ABSTRACT

A system where a trailer/dolly (10) is lifted from the ground (by means of block and tackle, hydraulic rams, etc.) so as to locate beneath, or nest within, the chassis or sub-frame (12) of a vehicle. When it is to be used the trailer/dolly is either coupled under a vehicle or trailer as a dolly only or it is lowered and moved rearwardly of the vehicle so it can be towed behind the vehicle using hitch (40). The chassis (14) of the trailer/dolly is in the form of a rectangular frame which can be enlarged in size by telescopic movements of members (20A B; 22A, B etc.). A large number of small wheels (16A, B; 18A, B etc.) may be provided on sprung stub-axles.

21 Claims, 7 Drawing Sheets

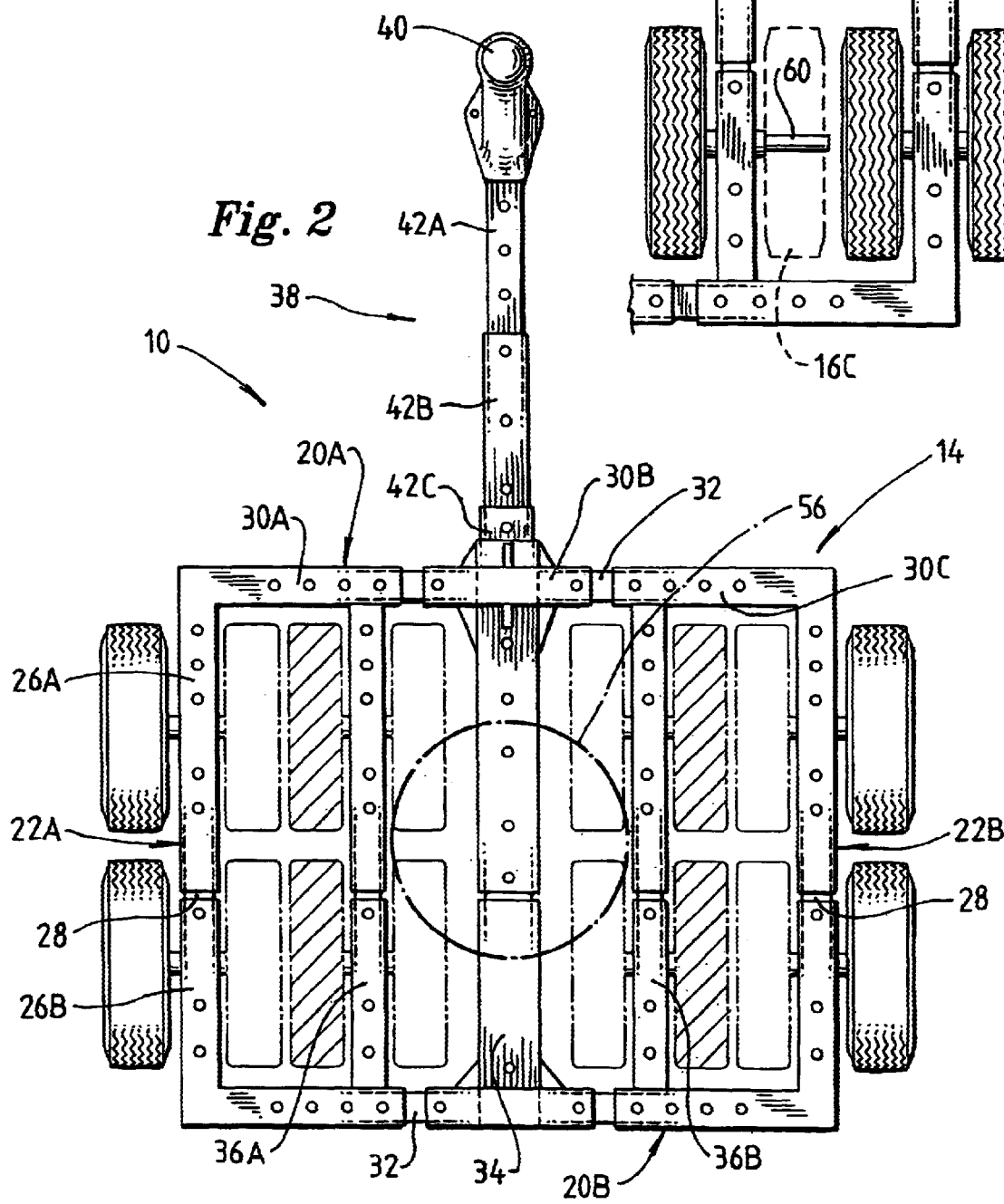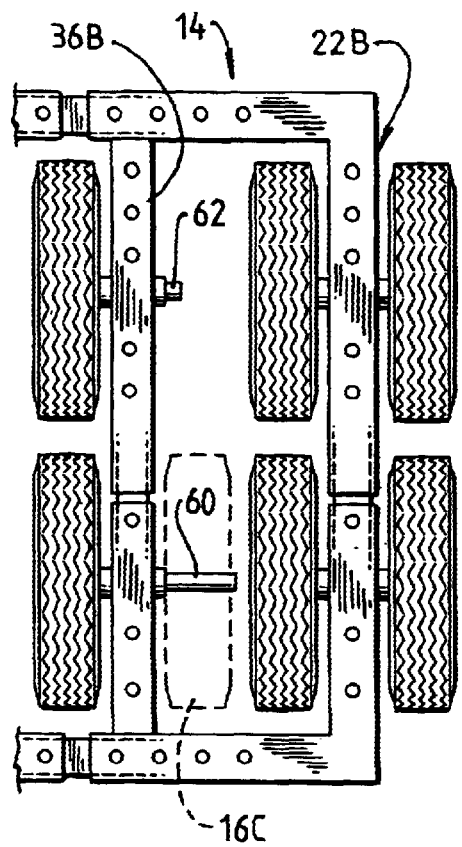

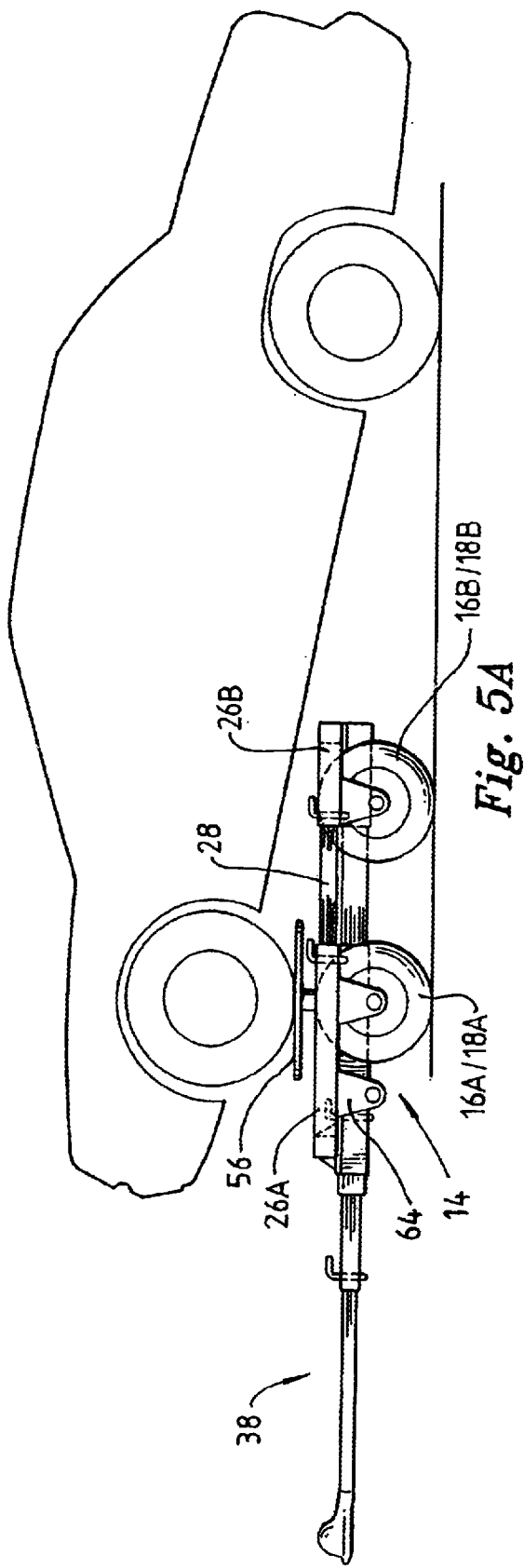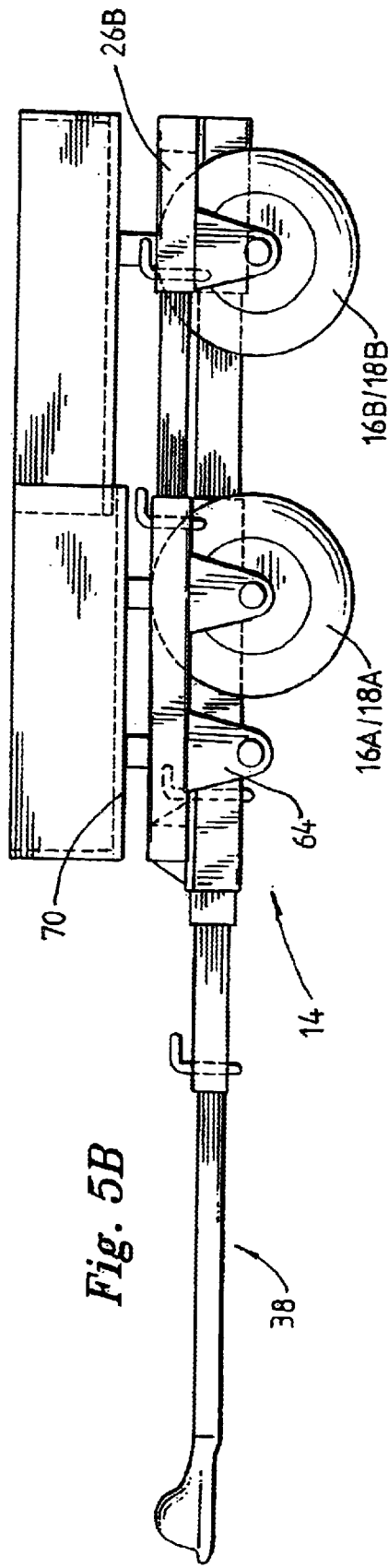

STOWABLE TRAILER/DOLLY SYSTEM

FIELD OF THE INVENTION

The present invention relates generally to a trailer or dolly and relates particularly, though not exclusively, to a stowable trailer or dolly system.

BACKGROUND OF THE INVENTION

Trailer or caravan axles are vulnerable to breakages, particularly under extended fatigue conditions which are experienced when a trailer or caravan is trailed large distances. When the axle breakage occurs in a remote location, which is often the case, the trailer or caravan must be abandoned and a tow truck taken to the trailer or caravan so that it can be trailed on its unbroken axle. Alternatively, for a single axle trailer or caravan, repairs to the broken axle must be made at the site of the breakage. In any event it is particularly inconvenient and expensive to repair the axle breakage.

Australian patent No. 521004 relates to a carry towing trailer known as a MOBITOW. The MOBITOW is essentially a dolly designed to be hitched to and drawn by a towing vehicle. The MOBITOW is configured to "piggyback" the front or rear wheels of an immobilised motor vehicle. The MOBITOW includes a chassis which can be moved adjacent the ground and the front or rear wheels of the immobilised vehicle then drawn onto cradles provided on the chassis. The chassis is then raised to a trailerable position above the ground and the immobilised vehicle towed as required. Although the MOBITOW provides a relatively convenient means for towing a vehicle it still does not overcome the problems identified in the preceding paragraph.

SUMMARY OF THE INVENTION

An intention of the present invention is to provide a trailer or dolly which can be stowed beneath or within a vehicle chassis or sub-frame.

According to one aspect of the present invention there is provided a trailer or dolly comprising:

a chassis for carrying a load, said chassis adapted to be towed behind a vehicle or another trailer; and a plurality of ground engaging wheels rotatably mounted to the chassis;

said chassis expandable to an operable configuration and contractible to a compact configuration, whereby in use, the trailer or dolly can be towed behind the vehicle or other trailer in a drawn position when the chassis is in the operable configuration, or the trailer or dolly can be stored beneath or within the vehicle or other trailer in a stored position when the chassis is in the compact configuration.

Preferably the chassis is adapted to be towed behind the vehicle or other trailer by a substantially horizontal articulated connection.

According to another aspect of the present invention there is provided a stowable trailer or dolly system comprising:

a chassis for carrying a load, said chassis adapted to be towed behind a vehicle or another trailer; and a plurality of ground engaging wheels rotatably mounted to the chassis; and means for locating the trailer or dolly chassis beneath or within the vehicle or other trailer, said means adapted to engage the chassis and move it into the stored position when the chassis is in the compact configuration, said chassis expandable to an operable configuration and contractible to a compact configuration whereby in use, the trailer or dolly can be towed behind the vehicle or other trailer in a drawn position when the chassis is in the operable configuration, or the trailer or dolly can be stored beneath or within the vehicle or other trailer in a stored position when the chassis is in the compact configuration.

Typically, said means for locating the trailer or dolly chassis beneath or within the vehicle chassis or sub-frame includes a block and tackle arrangement coupled between the vehicle and the trailer or dolly chassis so as to permit lifting of the trailer or dolly into the stored position. More typically, the block and tackle arrangement comprises one or more blocks including a ratchet block together with a chain or rope designed to operatively cooperate therewith.

Alternatively, said means includes one or more rails movably coupled to the vehicle chassis or sub-frame, said rails designed to move adjacent the ground and thereafter engage the trailer or dolly chassis and/or the wheels so that the trailer or dolly can be raised into the stored position.

In yet another embodiment, said means include one or more hydraulic rams connected to the vehicle chassis or sub-frame and the trailer or dolly chassis, respectively, said rams being designed to raise and lower the trailer or dolly into the stored or trailed position.

Typically, the trailer or dolly chassis includes a pair of elongate transverse and longitudinal members interconnected so as to form a generally oblong or square shaped chassis frame. More typically, the pair of transverse and/or longitudinal members are of a telescopic construction so that said members in a retracted position allow the trailer or dolly to be accommodated beneath or within the vehicle chassis or sub-frame in the stored position.

Preferably, the trailer or dolly chassis also includes a central elongate member opposing ends thereof being connected between the pair of transverse members. More preferably, the central member is also of a telescopic construction so that extension and retraction of the central member can occur together with a corresponding movement in the pair of longitudinal members.

Preferably, the trailer or dolly farther comprises a draw bar connected to the trailer or dolly chassis, a towing hitch being mounted to an end of the draw bar so as to permit coupling of the trailer or dolly to a tow bar of the vehicle with the trailer or dolly in the drawn position.

Typically, the draw bar is telescopically coupled to the trailer or dolly chassis so that in an extended position the trailer or dolly can be hitched to the vehicle in the drawn position, and in a retracted position the trailer or dolly can be stowed beneath or within the vehicle chassis or sub-frame in the stored position.

Alternatively, the draw bar is detachably coupled to the trailer or dolly chassis so that with the draw bar detached from said chassis the trailer or dolly can be accommodated by the vehicle in the stored position.

Preferably, the wheels are each of a relatively small diameter wherein the trailer or dolly chassis can be located in the stored position with adequate clearance between said wheels and the ground. Generally, the diameter of the wheels is from between 200 to 500 mm.

Typically, the wheels are mounted to the trailer or dolly chassis via a stub-axle for each of said wheels. More typically, each of the stub-axles is retractably coupled to the trailer or dolly chassis so that the wheels car be located inwardly or outwardly of the chassis.

Typically, the stub-axles are connected to a solid or swivel stub-axle mount of the trailer or dolly chassis, the stub-axle mount being disposed relative to said chassis so as to provide adequate clearance between the ground engaging wheels and the ground with the trailer or dolly in the scored position. More typically, the trailer or dolly includes a suspension system, wherein the suspension system is in the form of wheels, tyres, stub-axles or stub-axle mounts which are adapted to absorb and/or cushion any ground impact forces.

Typically, the trailer or dolly chassis is designed to carry a front or rear portion of a carriage, the rear or front wheels, respectively, of the carriage being trailed along the ground. In this example the carriage may include a caravan having a broken or damaged front or rear axle.

Alternatively, the trailer or dolly chassis is constructed in the form of a box trailer having a tray mounted to the chassis frame, the tray being designed to carry the load.

In one embodiment, the trailer or dolly is constructed of an aluminium alloy being relatively lightweight.

BRIEF DESCRIPTION OF THE DRAWINGS

In order to achieve a better understanding of the nature of the present invention a possible embodiment of a trailer or dolly will now be described in some detail, by way of example only, with reference to the accompanying drawings in which:

FIG. 2 is a plan view of the trailer or dolly shown in FIG. 1 with the draw bar in an extended position;

FIG. 2A is an enlargement of a portion of FIG. 2, with two of the wheels removed;

FIG. 5A is the trailer or dolly of FIG. 5 carrying a vehicle;

FIG. 5B is the trailer or dolly of FIG. 5 with a tray for carrying a vehicle;

DETAILED DESCRIPTION OF PREFERRED EMBODIMENTS

Figure 1:
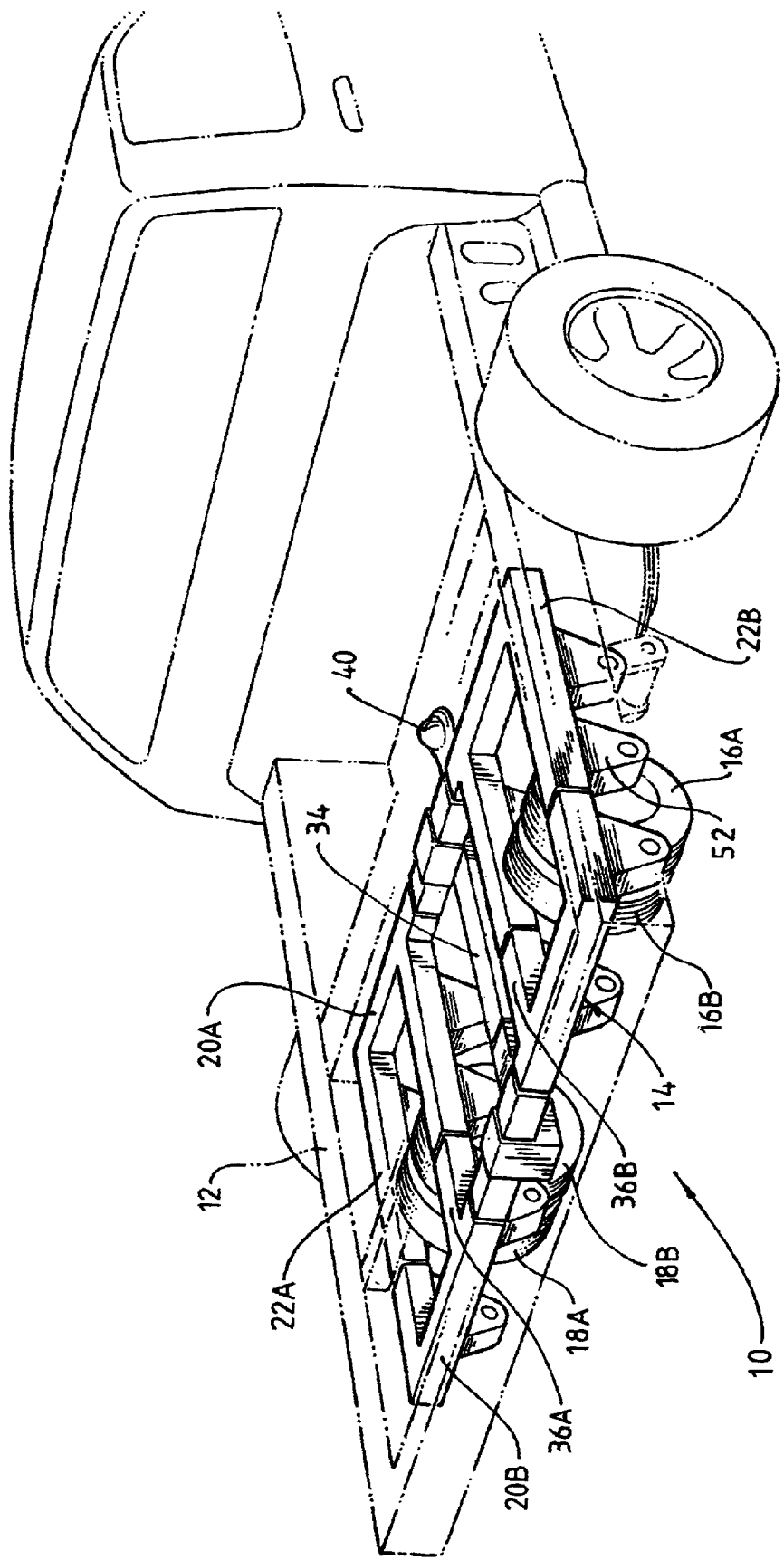
FIG. 1 is a perspective view of a trailer or dolly stowed beneath or within a vehicle chassis.

As shown in FIG. 1 there is a trailer or dolly shown generally as 10 mounted beneath or within a vehicle chassis 12.

The trailer or dolly 10 comprises a trailer or dolly chassis 14 being designed to carry a load (not shown), and two (2) pairs of ground engaging wheels 16A/B and 18A/B respectively which are rotatably mounted to the trailer or dolly chassis 14. The trailer or dolly 10 illustrated in FIG. 1 is in a stored position.

The trailer or dolly 10 depicted in FIG. 2 has been removed from beneath or within the vehicle chassis 12 into a drawn position in preparation for towing. The trailer or dolly chassis 14 includes a pair of opposing elongate transverse members 20A, 20B and a pair of opposing elongate longitudinal members 22A, 22B. The transverse and longitudinal members 20, 22 are interconnected so as to form the rectangular-shaped dolly chassis 14.

Each of the elongate members 22, 24 is of a telescopic construction. That is, the longitudinal members 22A/B each include a pair of abutting longitudinal tubular members 26A/B which are slidably movable relative to an internal sleeve 28 which is received therein. The transverse members 20A/B each consist of three (3) transverse tubular members 30A/B/C adjacent and abutting tubular members 30A/B and 30B/C having an internal transverse sleeve 32 about which they are slidably received.

The trailer or dolly chassis 14 also includes a central elongate member 34 having opposing ends connected between and extending perpendicular to the pair of transverse members 20A/B. The central member 34 is also of a telescopic construction so that extension and retraction of the central member 34 can occur together with a corresponding movement in the pair of longitudinal members 22A/B. The trailer dolly or chassis 14 has a pair of intermediate elongate members 36A/B opposing ends thereof being connected to opposing transverse tubular members 30A and 30C, respectively. The intermediate members 36A/B are located between and extend generally parallel to the central member 34 and each of the longitudinal members 22A/B.

The trailer or dolly 10 further comprises a draw bar 38 connected to the trailer or dolly chassis 14. A towing hitch 40 is mounted to an end of the draw bar 38 so that the trailer or dolly 10 can be hitched to a tow bat (not shown) of a vehicle with the trailer or dolly 10 in a drawn position. In this embodiment, the draw bar 38 consists of three (3) telescopic sections 42A/B/C being slidably received within and thus movable relative to each other. The telescopic section 42C is slidably received within the central member 34. The telescopic draw bar 38 is shown in a fully retracted and a fully extended position in FIGS. 1 and 2, respectively.

Figure 3:
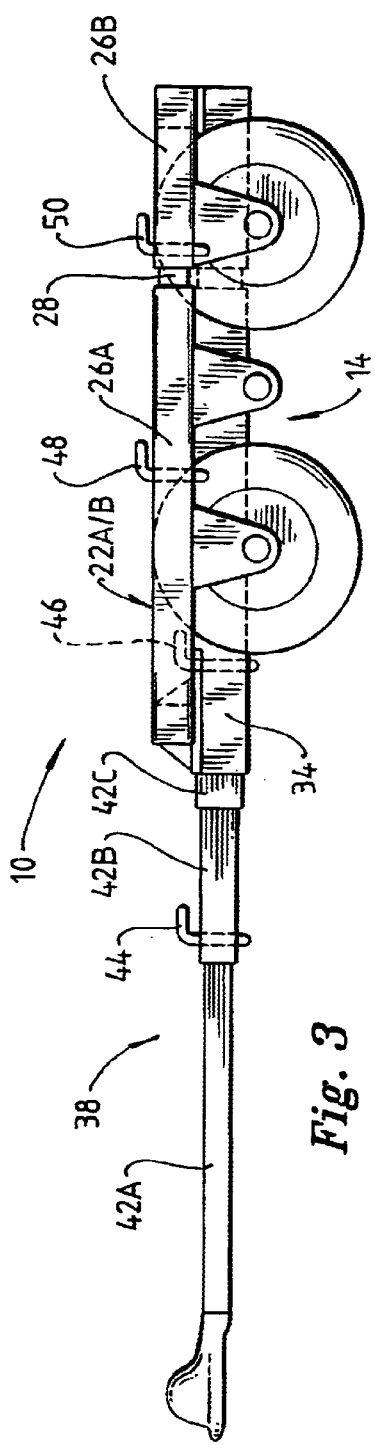
FIG. 3 is a side elevational view of the trailer or dolly illustrated in FIG. 2.

As best shown in FIG. 3, the trailer or dolly 10 includes a pair of draw bar locking pins 44, 46 designed to lock adjacent telescopic sections 42A and 42B together with telescopic section 42C relative to the central member 34. The locking pins 44, 46 each pass through both the adjacent telescopic sections 42A/B and the telescopic section 42C and central member 34, respectively. A set of chassis locking pins including longitudinal member locking pins 48 and 50 are configured to securely lock both the telescopic transverse and longitudinal members 20A/B and 22A/B whilst the trailer or dolly 10 is in use. The chassis frame locking pins including 48 and 50 pass through both the tubular members and their corresponding internal sleeve, for example longitudinal tubular member 26A and longitudinal sleeve 28.

As best illustrated in FIG. 1, the trailer or dolly includes twelve (12) stub axle mounts one of which is shown as 52, another of which is shown as 64 in FIG. 5A, each being mounted at various locations beneath the trailer or dolly chassis 14. Three (3) of the stub axle mounts 52' are mounted to each of the longitudinal and intermediate members 22A/B and 36A/B. An additional three stub axles may be mounted on the central member 34. A stub axle 60 in FIG. 2A of each of the wheels 16, 18 can be retractably inserted through one of the mounts 52. Thus, the wheels 16, 18 can be selectively located at anyone of thirty (30) positions.

FIG. 2 illustrates only sixteen (16) of the possible locations. A further eight (8) locations are possible due to the middle stub mounts between the stub mounts used in FIG. 2. In addition, a further six (6) locations are possible, three on either side of the central member 34. In FIG. 2A the wheel 16C mounted by extended stub axle 60. Stub axle 62 is shown retracted.

Figure 4:
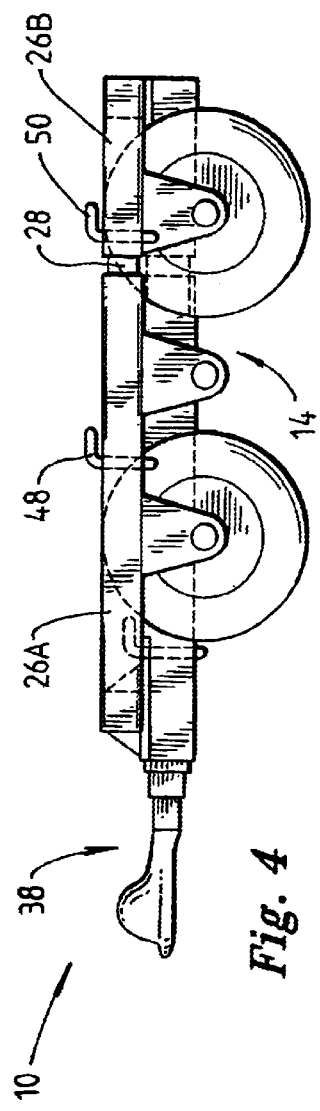
FIG. 4 is a side elevational view of the trailer or dolly depicted in FIGS. 2 and 3 with the draw bar in a retracted position.

The pair of ground engaging wheels 16, 18 in FIGS. 3 and 4 are located in the hatched positions as depicted in FIG. 2. In this example, the wheels 16, 18 are conveniently located inwardly of the trailer or dolly chassis 14 so that the trailer or dolly 10 can be located within the vehicle chassis 12 in the stored position. Similarly, the stub axles of the wheels 16, 18 shown in FIG. 1 are mounted to the central stub axle mounts 52 inwardly of the trailer or dolly chassis 14.

Figure 5:
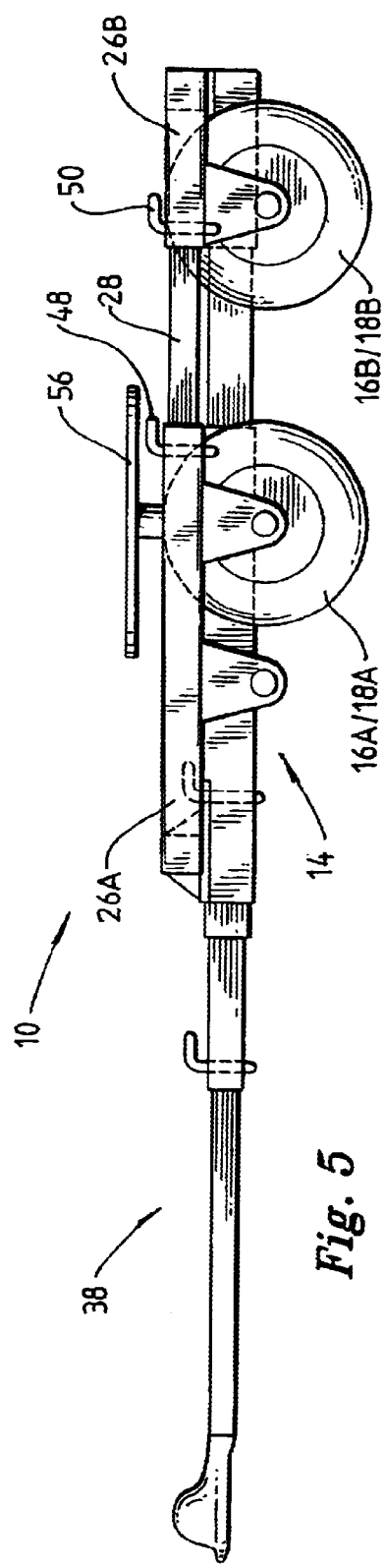
FIG. 5 is a side elevational view of the trailer or dolly having both the chassis and the draw bar extended.

The trailer or dolly chassis 14 in FIGS. 3 and 4 is shown in a retracted position. Locking pins 48 and 50 rigidly secure longitudinal tubular members 26A/B to the longitudinal internal sleeve 28. However, as shown in FIG. 5, the trailer or dolly chassis 14 may be extended whereupon one or both of the longitudinal tubular members 26A/B is telescopically slid over the internal sleeve 28 so as to extend the effective length of the trailer or dolly chassis 14. The locking pins 48, 50 secure the longitudinal tubular members 26A/B relative to the internal sleeve 28 so as to fix the chassis 14 in this position. The frontmost pair of wheels 16A, 18A are then moved to the intermediate stub axle mounts 52. It will be appreciated that the trailer or dolly in its drawn position, such as that illustrated in FIGS. 2, 3, and 5, may take various configurations including variations in the width and length of the trailer or dolly chassis 14 and the various positions of the ground engaging wheels 16, 18.

The trailer or dolly 10 of FIGS. 2 and 5 includes a turntable 56 pivotally mounted to the central member 34. The turntable 56 is designed to support a front or rear axle of an immobilised conveyance, including a vehicle (as shown in FIG. 5A), a caravan and a trailer (not depicted) requiring towing. The trailer or dolly 10 may include other support means for carrying a load. For example, as shown in FIG. 5B, a tray 70 may be mounted to an upper surface of the trailer or dolly chassis 14 wherein the trailer or dolly 10 represents a box-type trailer. The tray is preferably collapsible and includes sides. It is preferable that the trailer or dolly 10 is constructed of relatively lightweight materials. For example, the trailer or dolly chassis 14 may be constructed of an aluminum alloy which is also weldable and thus appropriate for fabrication purposes.

Figure 6A:
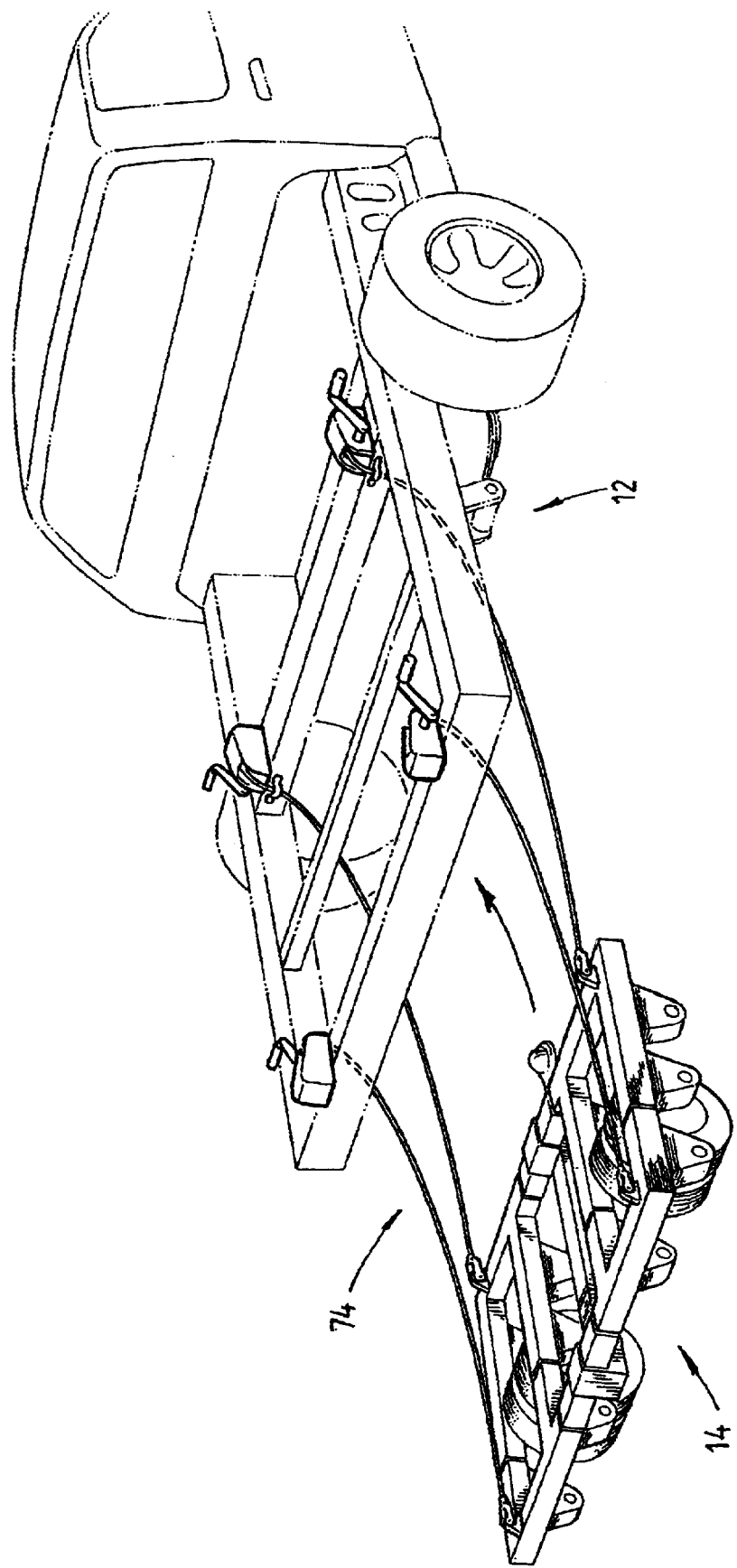
FIG. 6A is a perspective view of the trailer or dolly ready for stowing beneath or within the vehicle chassis of FIG. 1, with a block and tackle arrangement coupled between the vehicle chassis and trailer or dolly chassis.
Figure 6B:
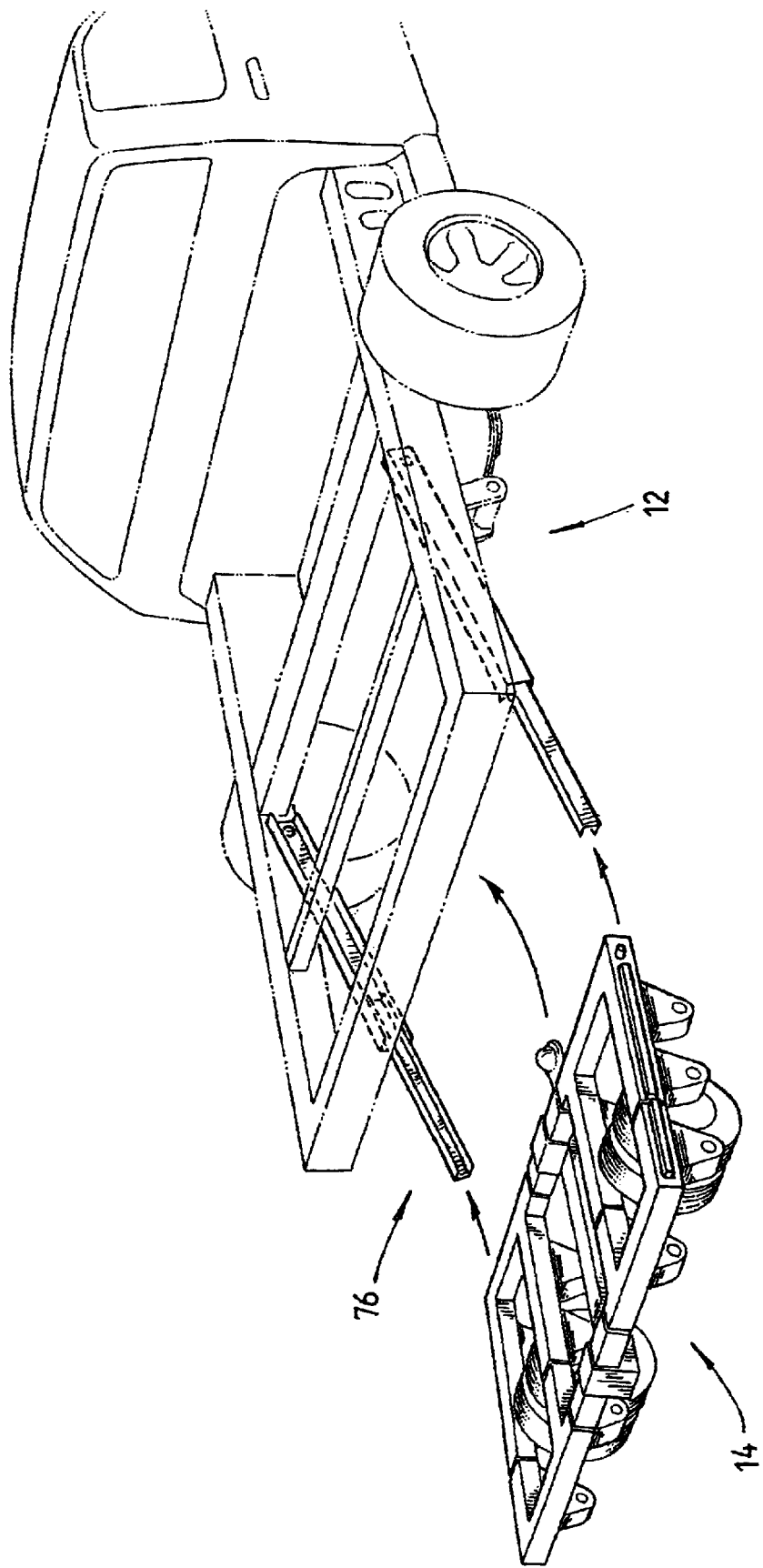
FIG. 6B is a perspective view of the trailer or dolly with a set of rails pivotally coupled beneath or within the vehicle chassis of FIG. 1, and ready to engage the trailer or dolly chassis.
Figure 6C:
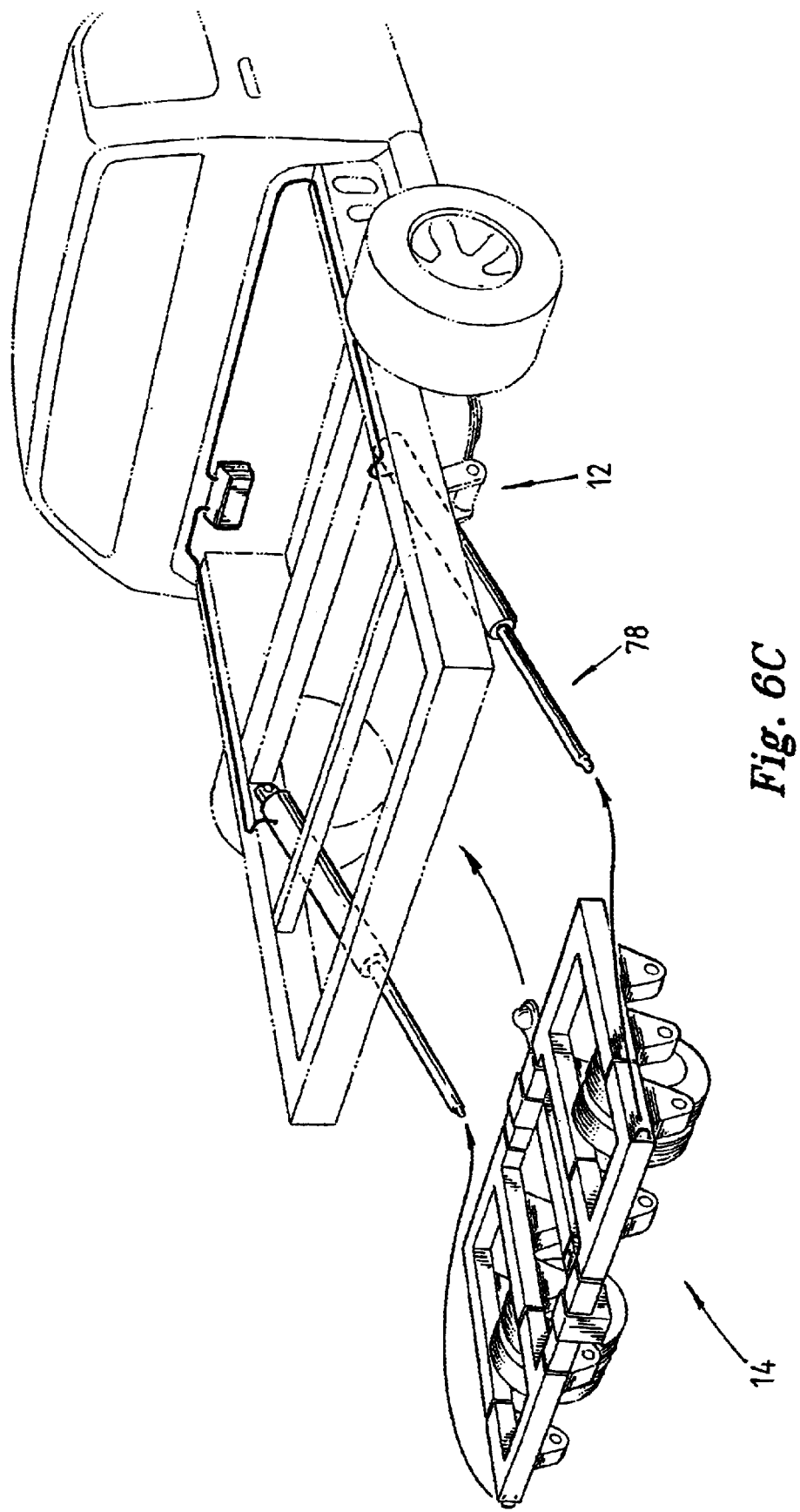
FIG. 6C is a perspective view of the trailer or dolly with a set of hydraulic rams pivotally coupled beneath or within the vehicle chassis of FIG. 1, and ready to engage the trailer or dolly chassis.

In FIGS. 6A, 6B and 6C, a trailer or dolly as broadly disclosed above is shown together with means for locating the trailer or dolly beneath or within a vehicle. The means for locating the trailer or dolly could include but is not limited to the following arrangements:

(i) a block and tackle arrangement 74 coupled between the vehicle chassis 12 and the trailer or dolly chassis 14 so as to permit lifting of the trailer or dolly 10 into the stored position;

(ii) one or more rails 76 slidably and/or pivotally coupled to the vehicle chassis 12 so that the rails can be moved adjacent the ground and thereafter engage the trailer or dolly chassis 14 and/or the ground engaging wheels 16, 18 so that the trailer or dolly 10 can be raised into the" stored position; and (iii) one or more hydraulic rams 78 connected at opposing ends to the vehicle chassis 12 and the trailer or dolly chassis 14, respectively, the rams being designed to raise the trailer or dolly 10 into the stored position.

Now that a possible embodiment of the present invention has been described in some detail it will be apparent to those skilled in the relevant art that the trailer or dolly described has at least the following advantages:

(i) the trailer or dolly can be conveniently stowed beneath or within a vehicle chassis or sub frame; and (ii) the stowable trailer or dolly system allows for storage of the trailer or dolly beneath or within a vehicle chassis or sub-frame with relative ease.

It will be apparent to those skilled in the relevant art that the present invention is not limited to the examples described but rather may extend to other variations/modifications not specifically described. For example, the draw bar and/or ground engaging wheels may be fully detachable from the trailer or dolly chassis. The trailer or dolly chassis may not in fact be extendable but rather by the nature of its construction be of such a size that it can be located beneath or within a vehicle chassis or sub-frame. Furthermore, the trailer or dolly is not to be limited to the specific construction described and may, for example, not include the longitudinal and/or transverse members.

It should be understood by a skilled addressee that if a vehicle does not have a chassis or the chassis is not adapted to be able to locate the trailer or dolly beneath or within, then a sub-frame may be attached to the vehicle which is adapted to locate the trailer or dolly beneath or within the sub-frame. The term sub-frame is to be construed to include this meaning without limiting its normal meaning.

All such variations and modifications are to be considered within the scope of the present invention the nature of which is to be determined from the foregoing description.

What is claimed is:

1. A stowable trailer-dolly system comprising:

a chassis for carrying a load, said chassis being a main structural frame resistant to deflection and resistant to bending, said chassis being expandable to an operable configuration and contractible to a compact configuration, said chassis adapted to be towed behind a vehicle in a drawn position by a substantially horizontally articulated connection about a vertical axis between said vehicle and said chassis when said chassis is in the operable configuration, a plurality of ground engaging wheels rotatably mounted to said chassis; and a positioning means for locating said chassis into a stored position relative to the vehicle having a vehicle frame when said chassis is in the compact configuration, said vehicle frame being a structural unit resistant to deflection and bending for supporting a body of said vehicle, said stored position being selected from the group consisting of beneath said vehicle frame and within said vehicle frame.

2. A stowable trailer-dolly system according to claim 1, wherein said chassis of said trailer-dolly includes at least two elongate transverse members and at least two longitudinal members interconnected so as to form a generally oblong or square shaped chassis and wherein the transverse and longitudinal members are of a telescopic construction so that said members in a retracted position allow said trailer-dolly to be accommodated in the stored position.

3. A stowable trailer-dolly system according to claim 2, wherein said chassis of said trailer-dolly also includes a central elongate member, opposing ends thereof being connected between two of the transverse members and wherein the central member is also of a telescopic construction so that extension and retraction of the central member can occur together with a corresponding movement in the longitudinal members.

4. A stowable trailer-dolly system according to claim 1, wherein the substantially horizontally articulated connection is in the form of a draw bar telescopically connected to said chassis of said trailer-dolly, and a towing hitch being mounted to an end of the draw bar so as to permit coupling of said trailer-dolly to a tow bar of the vehicle when said trailer-dolly is in the operable configuration.

5. A stowable trailer-dolly system according to claim 4, wherein the draw bar is detachably coupled to said chassis of said trailer-dolly so that with the draw bar detached from said chassis, said trailer-dolly can be accommodated by the vehicle in the stored position.

6. A stowable trailer-dolly system according to claim 1, wherein the wheels are each of a suitable diameter such that when said chassis of said trailer-dolly is located in the stored position, a clearance is provided between said wheels and the ground.

7. A stowable trailer-dolly system according to claim 1, wherein the wheels are mounted to said chassis of said trailer-dolly via a stub-axle for each of said wheels and wherein each of the stub-axles is retractably coupled to said chassis of the said trailer-dolly so that the wheels can be located inwardly or outwardly of said chassis.

8. A stowable trailer-dolly system according to claim 7, wherein the stub-axles are connected to a solid or swivel stub-axle mount of said chassis of said trailer-dolly, the stub-axle mount being disposed relative to said chassis so as to provide adequate clearance between the ground engaging wheels and the ground with said trailer-dolly in the stored position.

9. A stowable trailer-dolly system according to claim 1, wherein said chassis of said trailer-dolly is designed to carry a front or rear portion of a carriage, the rear or front wheels, respectively, of the carriage being trailed along the ground.

10. A stowable trailer-dolly system according to claim 1, wherein said chassis of said trailer-dolly is constructed in the form of a box trailer having a tray mounted to the chassis, the tray being designed to carry the load.

11. A stowable trailer-dolly system according to claim 1, wherein said positioning means for locating said chassis in the stored position is adapted to engage said chassis of said trailer dolly and move said trailer-dolly into the stored position when said chassis is in the compact configuration.

12. A stowable trailer-dolly system according to claim 11, wherein said positioning means for locating said chassis of said trailer-dolly in the stored position includes a block and tackle arrangement coupled between the vehicle and said chassis of said trailer-dolly so as to permit lifting of said trailer-dolly into the stored position.

13. A stowable trailer-dolly system according to claim 12, wherein the block and tackle arrangement comprises one more blocks including a ratchet block together with a chain or rope designed to operatively cooperate therewith.

14. A stowable trailer-dolly system according to claim 11, wherein said positioning means for locating said chassis of said trailer-dolly in the stored position includes one or more rails movable coupled to said frame of the vehicle, said rails designed to move adjacent the ground and thereafter engage at least one member selected from the group consisting of said chassis of said trailer-dolly and the wheels so that said trailer-dolly can be raised into the stored position.

15. A stowable trailer-dolly system according to claim 11, wherein said positioning means for locating said chassis of said trailer-dolly in the stored position includes one or more hydraulic rams connected to said frame of the vehicle and to said chassis of said trailer-dolly, respectively, said rams arranged to raise and lower said trailer-dolly into the stored or drawn position.

16. A stowable trailer-dolly system according to claim 1, wherein said positioning means for locating said chassis in the stored position is adapted to engage said frame and move said trailer-dolly from the stored position into the drawn position such that said chassis may be expanded into the operable configuration.

17. A stowable trailer-dolly system according to claim 1, wherein said chassis is provided with a load carrying area that is separate from any load carrying area of the vehicle.

18. A stowable trailer-dolly system according to claim 1, wherein said chassis of said trailer-dolly is smaller, in the compact configuration, than in the operable configuration to facilitate storage beneath said frame of the vehicle.

19. A stowable trailer-dolly system according to claim 1, wherein the plurality of wheels are adapted to be reconfigurably mounted to said chassis at a plurality of positions on said chassis.

20. A stowable trailer-dolly system according to claim 1, wherein said vehicle is a motor vehicle.

21. A stowable trailer-dolly system according to claim 1, wherein said vehicle is a second trailer.

* * * * *